Jan. 6, 1959    J. TURNER    2,867,288
DUST FILTER AND COLLECTOR
Filed July 1, 1955    5 Sheets-Sheet 1
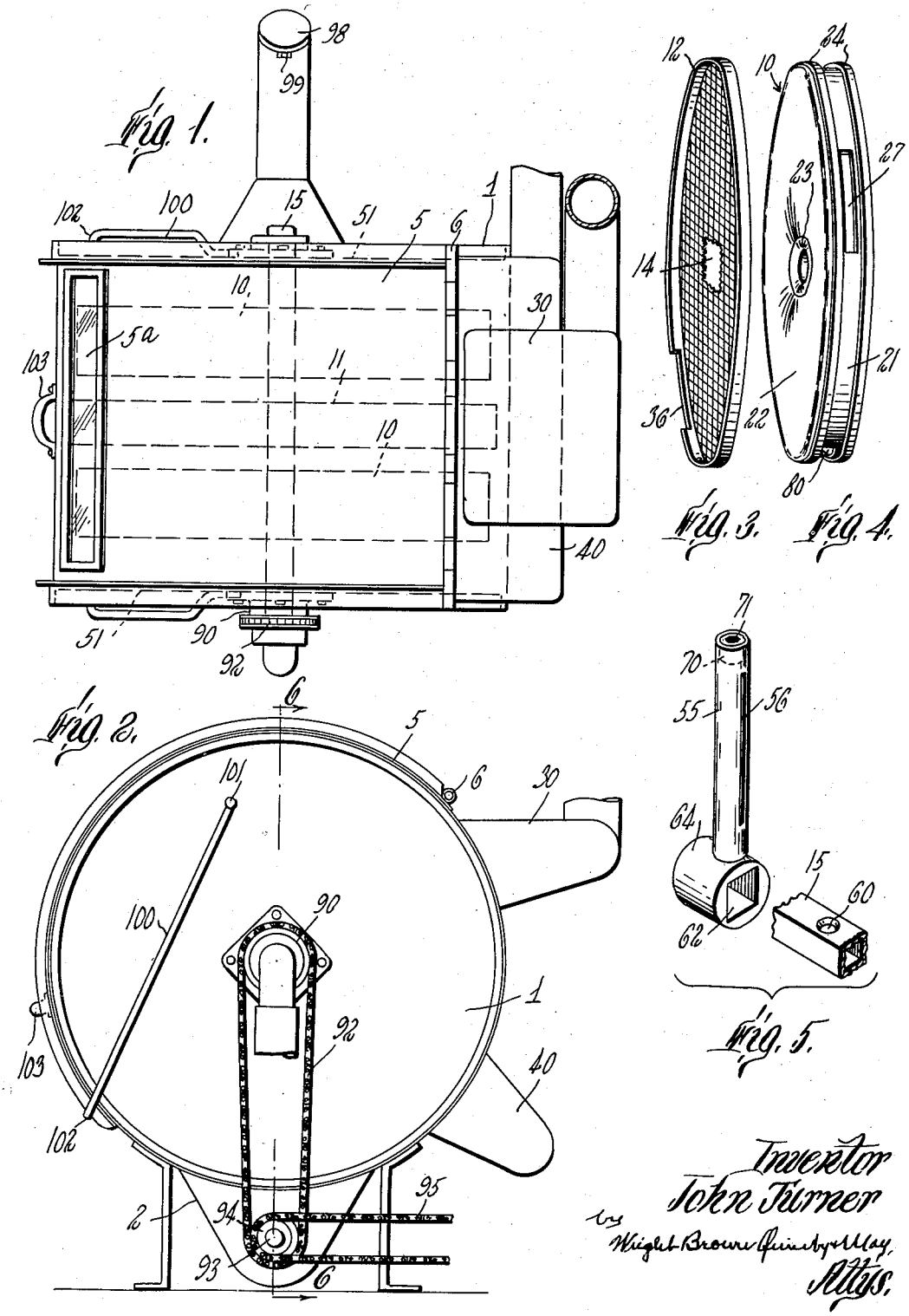

Jan. 6, 1959  J. TURNER  2,867,288
DUST FILTER AND COLLECTOR
Filed July 1, 1955  5 Sheets-Sheet 2
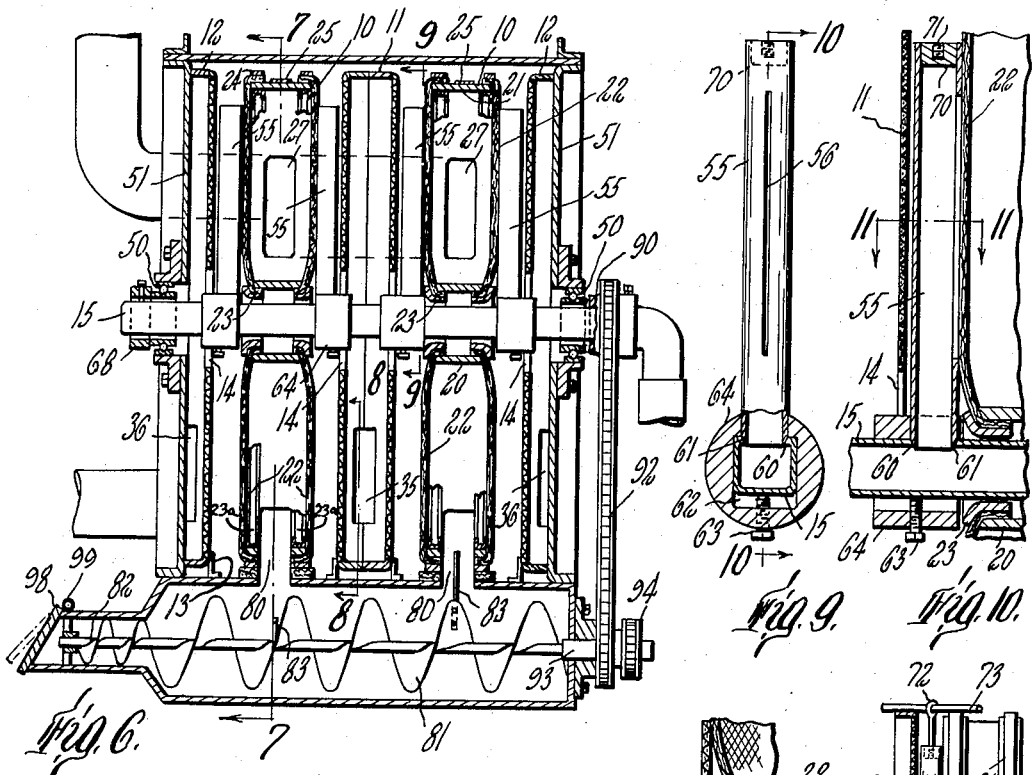
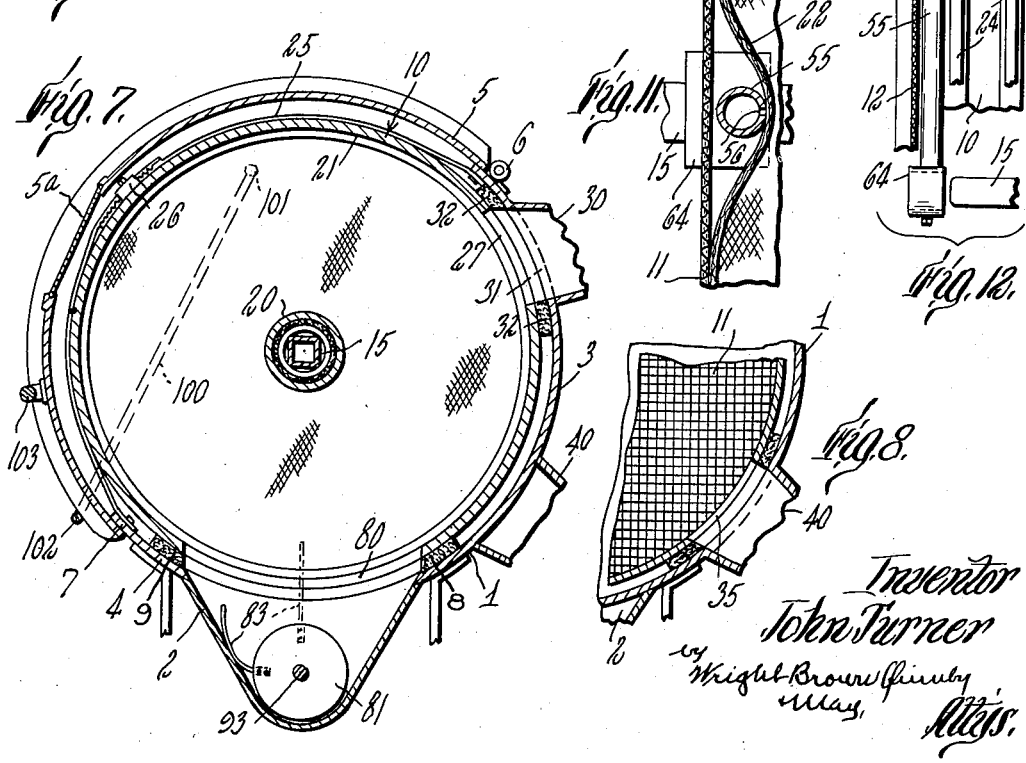

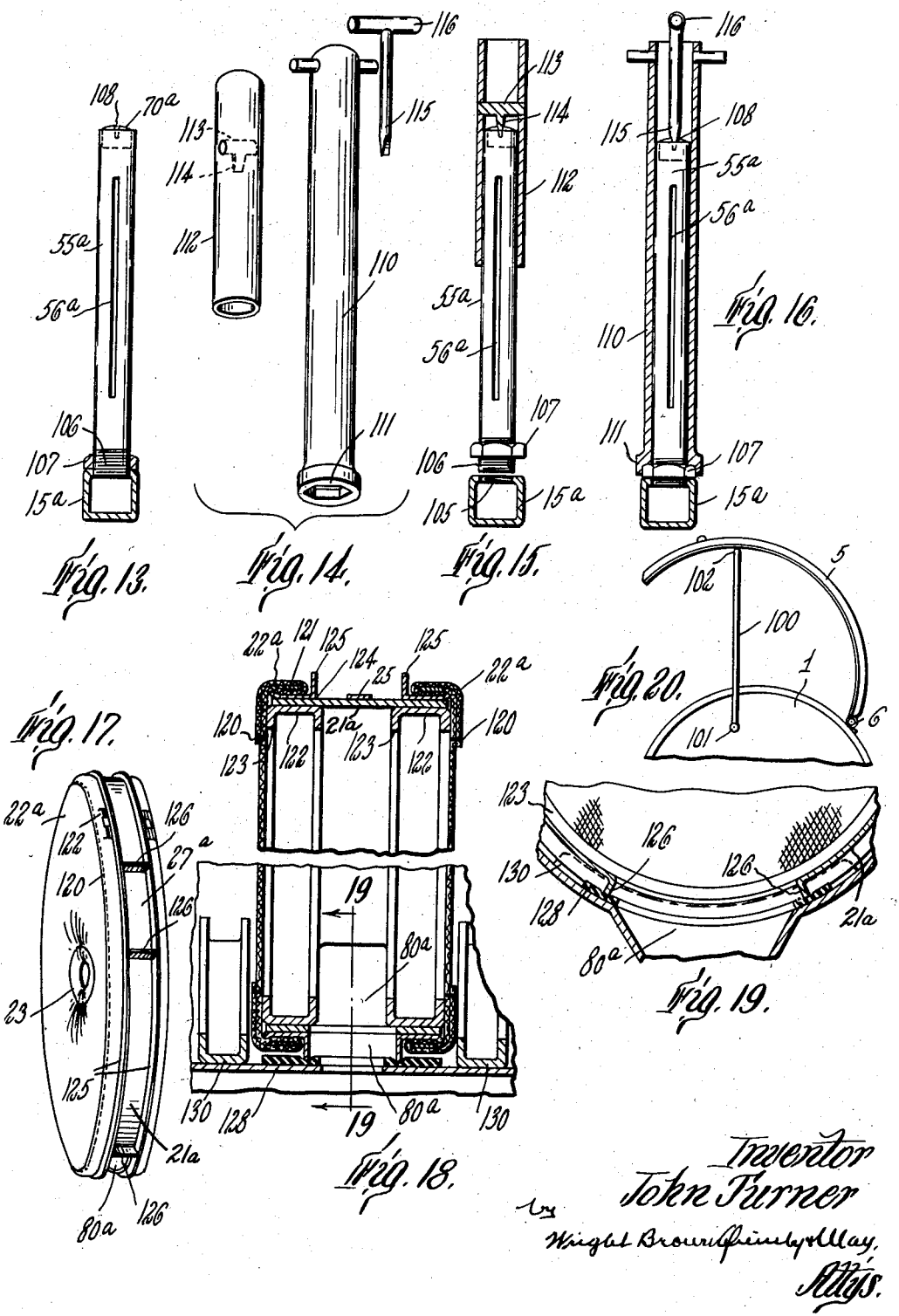

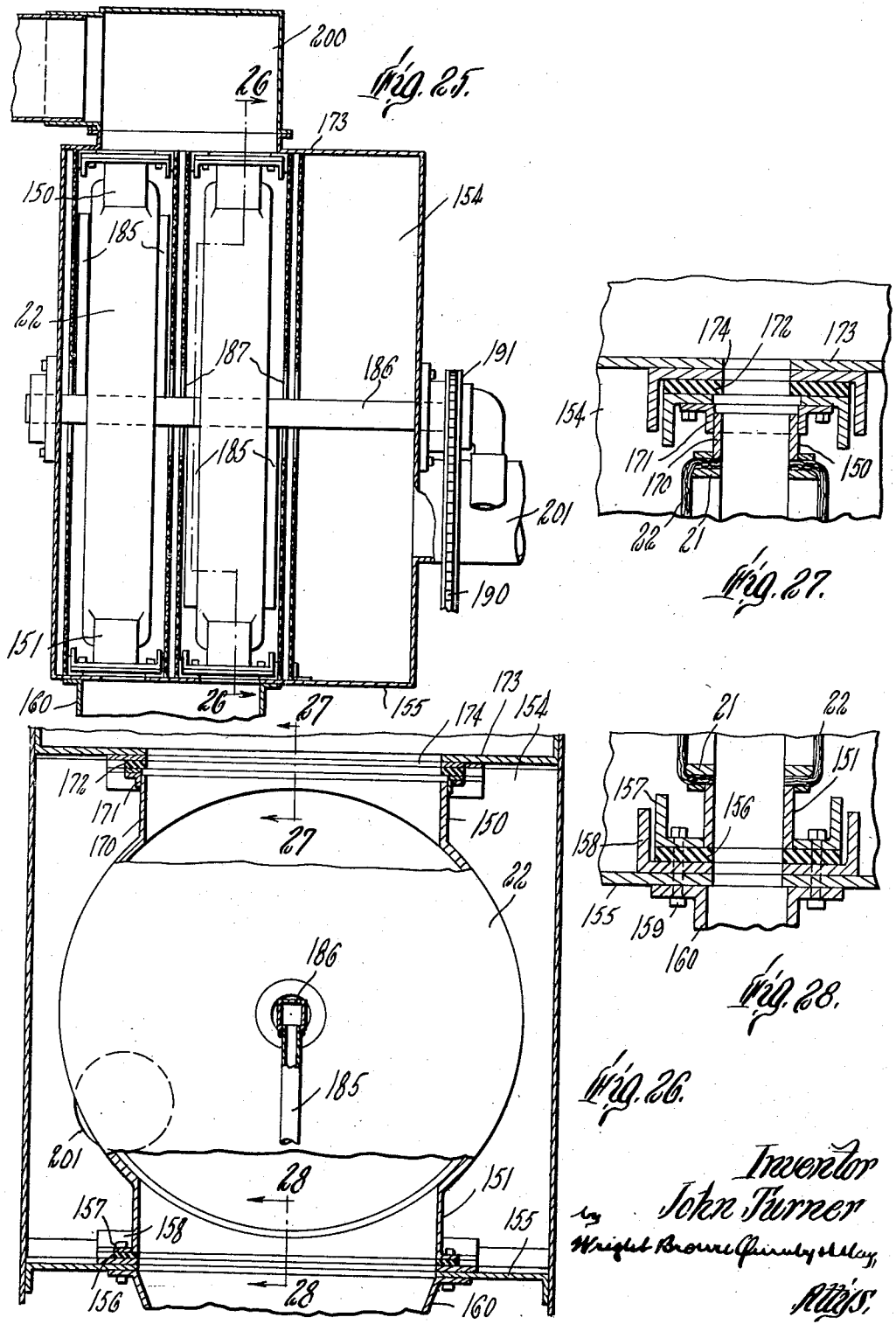

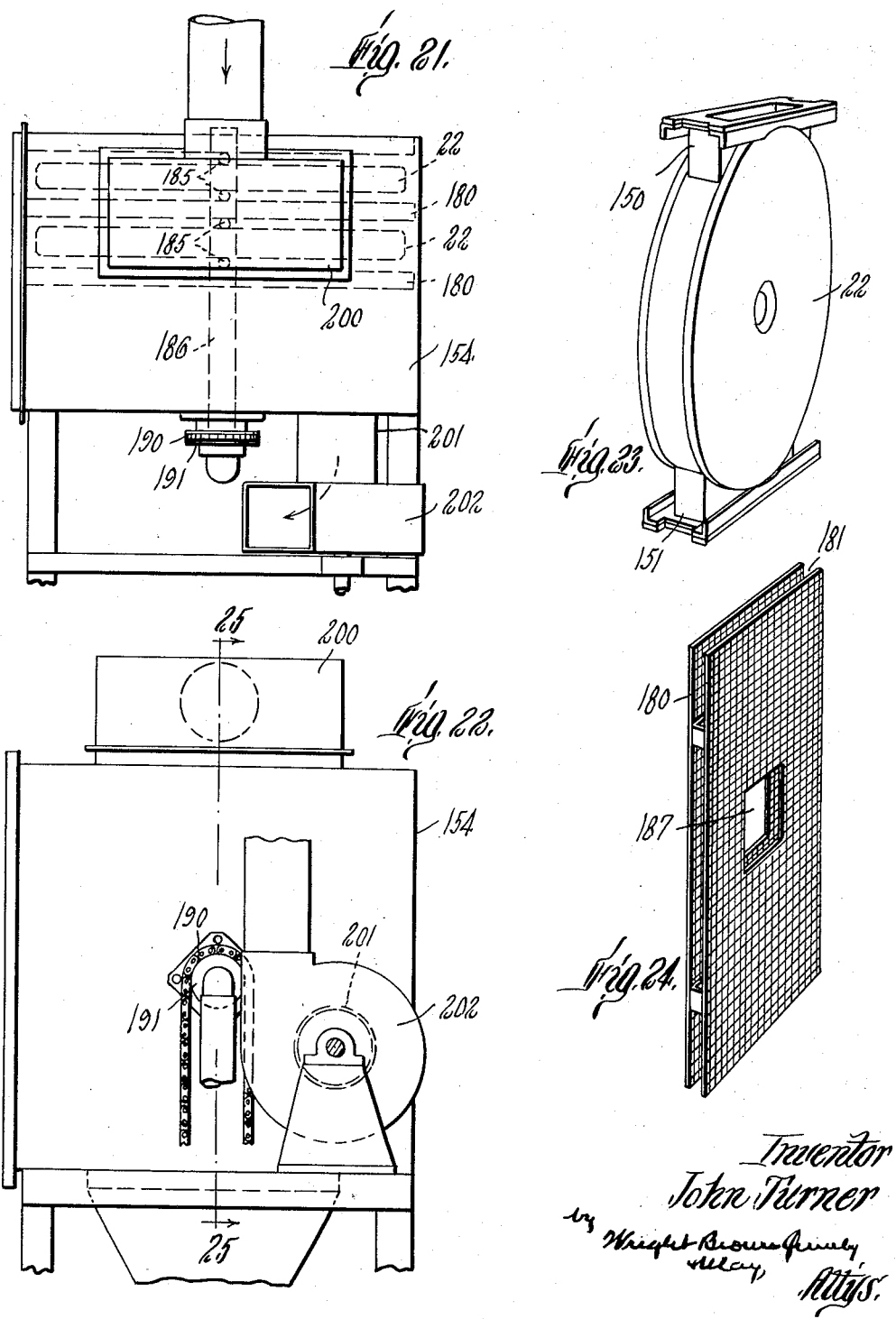

United States Patent Office 2,867,288
Patented Jan. 6, 1959

2,867,288

DUST FILTER AND COLLECTOR

John Turner, Newton, Mass., assignor, by mesne assignments, to Koppers Company, Inc., Pittsburgh, Pa., a corporation of Delaware Application July 1, 1955, Serial No. 519,377

21 Claims. (Cl. 183—61)

This invention relates to mechanism for filtering out and collecting dust and other solid particles from air. It has for certain objects to produce a filter capable of handling large volumes of air with high filtering efficiency, to produce a filter which can be built economically, to produce a filter which can be placed out of the way in elevated position so that it does not occupy valuable floor space, to produce a filter in which the filtering element or elements are without seams, and to produce a filter wherein the solids may be removed from the filter without requiring the use of complicated valve mechanism. The application in which this invention is disclosed constitutes a continuation-in-part of application, Serial No. 444,043, filed July 19, 1954, now abandoned.

To these ends the filter elements are each composed of an annulus of felt, or the like, which is clamped at its margins between inner and outer rings. The dust-laden air is introduced between a pair of such elements which are pressed away from each other by action of the air toward or in contact with foraminous supporting disks through which and the adjacent filter elements the air is forced. A reverse flow pressure pipe is rotated between the supporting disks and their adjacent filter elements, each pipe having a longitudinal slot facing the filter element and acting to blow entrained dirt and other solid matter from its opposite face. Air under pressure is conducted to the interior of the pipe through a rotatable central hollow shaft which carries it, the parts being so formed as to facilitate assembly or disassembly of the parts.

In order to discharge solid material from the filter this material is collected in the lower portion of the filter casing from which it is conveyed into a reduced cross sectioned dishcarge pipe which it completely fills and from the outer end of which it is discharged as fast as it accumulates. By causing it to fill the area of the discharge, this material acts as its own controlling valve element, so that there is no necessity of employing complicated valve arrangements to avoid entrance or discharge of free air with the solids.

For a more complete understanding of this invention, reference may be had to the accompanying drawings in which Figure 1 is a top plan view of a dust filter and collector embodying the invention.

Figure 2 is one end elevation of the same.

Figure 3 is a perspective view of one of the foraminous filter element supports.

Figure 4 is a perspective view of a filtering unit comprising a pair of spaced sheet material annular filtering elements.

Figure 5 is an exploded perspective view of a blow pipe and its shaft.

Figure 6 is a cross sectional view on line 6—6 of Figure 2.

Figures 7, 8 and 9 are detail sectional views on the correspondingly numbered section lines of Figure 6, Figure 9 being drawn to a larger scale.

Figure 10 is a detail sectional view on line 10—10 of Figure 9.

Figure 11 is a detail sectional view on line 11—11 of Figure 10.

Figure 12 is a fragmentary exploded view partly in side elevation and partly in section showing a manner of assembly of certain of the parts.

Figure 13 is a side elevation of a blow pipe and its mounting showing a modified construction.

Figure 14 is an assembly of tools which may be employed in attaching and detaching the blow pipe of Figure 13 with reference to its supply pipe.

Figures 15 and 16 are elevational views of the blow pipe showing successive steps and attachment of it to the supply pipe, certain of the tools being shown in longitudinal section.

Figure 17 is a view similar to Figure 4 of a filtering unit but showing a modified construction.

Figure 18 is a fragmentary vertical longitudinal sectional view through a modified construction.

Figure 19 is a detail sectional view on line 19—19 of Figure 18.

Figure 20 is a side elevation of the upper portion of the filter showing the casing cover open.

Figure 21 is a top plan view showing a modified construction, certain of the parts within the casing being shown in dash lines.

Figure 22 is an end elevation of the construction shown in Figure 21.

Figure 23 is a perspective view of a filtering unit, a modification of the structure of Figure 4, and applicable to the structures of Figures 21 and 22.

Figure 24 is a perspective view of the screen for use in the modification of Figures 21 and 22.

Figure 25 is a sectional view on line 25—25 of Figure 22.

Figure 26 is a sectional view on line 26—26 of Figure 25.

Figures 27 and 28 are detail sectional views on lines 27—27 and 28—28, respectively, of Figure 26.

The filter, as shown best in Figure 7, comprises a casing 1 having a central downward somewhat V-shaped extension 2, from the sides of which extend an upwardly curved rear wall member 3 and a shorter front wall member 4. A curved cover 5 is hinged at 6 to the upper edge portion of the wall member 3 and extends into overlapping relation with the upward extremity 7 of the wall member 4. When in closed position, this cover with the other parts of the casing form a substantially horizontal cylindrical chamber provided with a downward projection at the portion 2. This cover may be provided with a transparent window portion 5a if desired.

The wall portion 3 is provided with a marginal sealing strip 8 and the wall portion 4 is provided with a similar strip 9. On these sealing strips may be seated a plurality of filtering members 10 and supporting members 11 positioned between each pair of filtering elements with an end supporting member 12 outwardly of each of the end members. These supporting members 11 and 12 have their side portions formed foraminous. They may, for example, be formed of expanded metal which presents openings of considerable size therethrough. These foraminous supports may be engaged by the sides of the filtering members and hold them against undue deformation. The elements 11 and 12 may be provided with supporting angle members 13 which may rest upon the packing strips 8 and 9 and they are provided with central apertures as at 14 for the free passage of a central shaft 15.

Each of the filtering members comprises an inner and outer ring member 20 and 21 over the inner and outer faces of which may be extended peripheral portions of a pair of flexible filtering elements 22. These elements, for example, may be formed of felt and their inner and outer margins may be turned over the edges of the rings 20 and 21 and be there retained by other rings 23 and 24 which are sufficiently smaller and larger, respectively, than their cooperating rings 20 and 21 to engage the outer faces of the elements 22 and clamp them firmly against the corresponding faces of the rings 20 and 21 in a manner similar to that of fabric between embroidery holding rings. These rings 20 may be reinforced internally as by internally flanged rings 23a which hold the rings 20 and 21 against out-of-round distortion. The filtering members so formed, each of a pair of filtering elements 22 and their supporting rings, are mounted on the packing rings 8 and 9 and may be held thereagainst by metallic straps 25. Each such strap is preferably formed in two overlapping parts as shown best in Figure 7 with oppositely disposed serrated faces and which may be held in clamped relation by a suitable clamp 26. By this means the filtering members are held within the casing in proper position and do not depend upon the remainder of the casing to hold them in position.

Each of these filtering members is provided through its outer ring 21 with a slot 27 through which air to be filtered may be passed into the filtering member between its filtering elements 22 and it may be so introduced through an air intake manifold 30 secured over slots 31 through the casing wall 3 in line with the slots 27 of the filtering members. A gasket 32 may be interposed between the casing member 3 and the manifold 30 to prevent leakage between these parts.

The filtered air after passing through the filtering elements 22 is withdrawn from the casing through slots 35 and 36 therethrough at the opposite sides of the supports 11 and 12 from the filtering elements, these slots communicating with a manifold 40 which may be connected to a suitable exhaust fan (not shown) by which the air to be filtered may be drawn through the filter, the cleaned air being discharged through the exhaust fan.

The central shaft 15 to which reference has been made is journaled in suitable bearings 50 in the end walls 51 of the casing and extends through the openings 14 of the supporting members 11 and 12, and through the central rings 23 of the filtering members. Between each filtering element 22 and its next adjacent support 12 there is movable a blow pipe 55 which is provided with a slot 56 facing the adjacent filter element 22 and through which air is discharged against the filter element 22 in the opposite direction to the passage of the filtered air from within the filtering member. Each of these pipes 55 is carried by the central shaft 15 and derives its supply of air under pressure therefrom.

As shown best in Figures 9 and 10, this central shaft 15, which is hollow, is made polygonal in shape, and as shown is square, and it is provided at suitable spaced points along its length with holes 60 shaped to receive mating end faces 61 of the pipes 55. Each of these pipes 55 is provided with a block 64 shown as cylindrical in shape, and which is provided with a slot 62 to receive the shaft 15 therethrough. Each block 64 is provided with means such as a set screw 63 which may engage the pipe 15 on the opposite side to its hole 60 and by the tightening of which the end 61 of the pipe may be clamped into sealing engagement with the pipe 15 about the margin of its pipe-receiving opening 60. This affords a convenient method of releasably securing the blow pipes to the central shaft 15 so as to permit easy assembly and disassembly of the parts. For example, by loosening the set screws 63 and removing the end collar 68 from one end of the shaft, the shaft 15 may be removed axially from the filter casing.

In order to facilitate reassembly of the parts, the outer end of each pipe 55 can be closed off by a plug 70 provided with a threaded opening 71 into which a screw eye 72 may be threaded as shown in Figure 12. Through the eye of this screw eye, a rod 73 may be placed, suspending the pipe from the adjacent parts in position for the shaft 15 to be passed through its block 61 after which the set screws 63 may be tightened, securing the pipes in position. The rods 73 and the screw eyes 72 may then be removed.

Where the pipe 55 is positioned, the filtering element 22 is held away from the support 11 or 12 in the manner shown in Figure 11. Elsewhere the filtering element is held against too great extension by contact with the supporting wall member 11 or 12 as shown in this Figure 11.

The solid material filtered out passes down through a slot 80 through the ring members 21 of the filtering members and into the depending portion 2 of the casing. In this portion it is engaged by a suitable conveyor shown as of the screw type as 81 and is there directed into a reduced diameter pipe portion 82.

In order to maintain the slots 80 clear for the passage of solid materials, it may be found desirable to attach to the conveyor 81 at each of these slots a spring 83. When opposite to its slot 80, each spring moves up into its slot as shown in the right hand filtering unit of Figure 6 and in dotted lines in Figure 7. Elsewhere it is crowded down by the casing portion 2 and follows around with the conveyor.

This conveyor and the shaft 15 are rotated simultaneously and for this purpose each is shown as provided with a sprocket wheel 90 connected by a sprocket chain 92, while the shaft 93 of the conveyor 81 is provided with a sprocket wheel 94 about which may be passed a chain 95 leading to any suitable driving mechanism.

The parts are so formed that the solid materials are directed into the reduced diameter portion 82 and until such time as they fill this portion, the conveyor rotates freely therein. It also rotates within the portion 2 and tends to feed the solid material therein lengthwise thereof and into the portion 82. When this portion 82 becomes entirely filled with such solid material, the action of the conveyor is to force this material out through the outer end thereof and past a gravity-operated flap valve 98 which is hinged at 99 freely to the outer end of the portion 82.

The mass of solid material within this portion 82 acts as an automatic valve to prevent leakage of air therepast, but when this portion 82 is full of solid material, the action of the conveyor is to expel it from the portion 82 past the valve 98 which lifts sufficiently to permit this.

The provision of the straps 25 for holding the filter members in position relieves the casing from this duty which merely holds the shaft 15 and the parts carried thereby, it being unnecessary to provide any packing between either the filtering members or their supports 11 and 12 with respect to the casing.

As shown a bail shaped member 100 pivoted at 101 to opposite ends of the casing may have its central portion 102 engaged with the outer face of the cover member to hold it closed, and this cover member may be provided with a handle 103 to facilitate lifting it. When it is so lifted the member 100 may be swung upwardly beneath it and thus hold it open as shown in Figure 20.

Certain modified constructions of the filter are illustrated in Figures 17 and 19 and modifications in the construction and attachment of the blow pipes to the center rotary shaft, and the tools for manipulating them have been shown in Figures 13 to 16.

Referring first to Figures 13 to 16, the rotary shaft 15a is shown as provided with a threaded opening 105 to receive the threaded inner end 106 of the blow pipe 55a, and a lock nut 107 is threaded onto the pipe extremity for engagement with the outer face of the shaft 15a. The pipe 55a has a longitudinal slot 56a for the discharge of air under pressure. Its outer end is closed off as by a plug 70a which may be fixed within the outer end of the pipe in any suitable manner. This plug 70a as shown may be provided with a transverse screwdriver slot 108.

In order to assemble the blow pipe 55a with relation to the air supply pipe 15a, tools such as are shown in Figure 14 may be employed. Such tools may include a pipe 110 having one end 111 formed with a polygonal socket to fit over the lock nut 107.

There is also shown a second pipe tool 112 which may be placed over the pipe 55a in the manner shown in Figure 15, this pipe being provided with a transverse member 113 provided with a depending screwdriver-like projection 114 which may be engaged in the slot 108. With the pipe 112 partially enclosing the blow pipe 55a as shown in Figure 15, this pipe 112 is turned so as to engage the threaded end 106 of the pipe within the mating portion 105 of the shaft 15a, the lock nut 107 then being in retracted position. The pipe 55a may now be screwed into the shaft 15a to the desired extent and stopped with the slot 56a facing the filtering element adjacent thereto. The pipe 112 may then be removed and the pipe 110 placed in position to engage the lock nut 107 so that by turning the pipe 110, this lock nut 107 may be turned down against the shaft 15a while the pipe 55a is held against turning so that its slot 56a may not be turned out of proper position, by engagement in the slot 108 of a screwdriver-like tool 115 having a transverse handle 116 by which it may be held against rotation with the pipe tool 110. After the pipe is secured in position, the tools 115 and 110 may be removed therefrom, leaving the pipe 55a in proper secured position.

Referring to Figures 17, 18 and 19, the outer margin of each of the filter elements 22a is shown as formed within an annular loop portion formed by turning back this margin on itself and attaching it as by stitching at 120 to an intermediate portion thereof. Through this loop there is then passed a strap 121, the ends of which may be brought out as at 122 (Figure 17) and be secured together in overlapping relation at 26 in Figure 7. The strap 121 then causes the folded outer margin to overlie the outer ring member 21a of the filtering member. This outer ring member 21a may further be reinformed in order that it may be maintained in true circular form as by a pair of reinforcing rings 122 having inwardly directed stiffening edge flanges 123.

These outer marginal portions of the filtering elements may also overlie annular angle members 124, each having an outwardly directed flange 125. This flange 125 and outwardly turned end portions 126 at the extremities of the central slot 80a through which the solid material is discharged form together a rectangular marginal flange about the opening 80a which may engage and indent a rectangular sealing gasket 128 surrounding the discharge opening 80 so as to seal this opening to the mating discharge opening of the casing 2. The entrance 27a for the air to be filtered may also be sealed in a similar manner as by the flanges 125 and the flanges 126 as shown in Figure 17.

The casing itself may also be internally reinforced as by concave flanged spacers 130 on either side of each of the filter members.

An important feature of this invention resides in the fact that the filter elements 22 or 22a are stretched to drum tightness between the inner and outer margins at the supporting rings. This may be readily accomplished by securing the outer margin to the outer ring and then driving in the inside ring 23 carrying with it the margin at the central hole through the filter element, while this is supported about the hole by the edge of the ring 20 or 20a. By so tightening the filter element it is found that not only is the filtering capacity very much increased, but it is more effectively cleaned by the reverse flow from the blow pipe.

In Figures 21 to 28 a modified construction is illustrated in which the outer casing is rectangular instead of circular. This construction is easier and cheaper to build than the circular casing shown in the preceding Figures and has certain other advantageous features.

Referring to these Figures, the filter member is shown detached in Figure 23. It comprises the spaced circular filtering elements 22 as in the previous figures, and which are stretched tight over the edges of the rings 20 and 21, as previously described. However, the casing rings are provided with upper and lower extensions 150 and 151 adapting the filter member to be sealed to the interior of the rectangular casing 154. One of these extensions, herein shown as the lower extension 151, is secured to the bottom plate 155 of the casing by means including a packing member 156 between a pair of angles 157, 158. The packing member 156 is compressed between the angles 157 and 158 by means of securing bolts 159 (see Figure 28) which also secure the upwardly flanged end of a dirt conveyor chute 160. This provides a sealing engagement between the lower portion of the filter member and the chute 160.

The upper extension 150 may be provided with a slip joint comprising the telescopically arranged tubular members 170 and 171, the upper of which, 171, is secured through a packing member 172 to the upper wall 173 of the casing 154 in the same manner as the lower extension 151 is secured, except that here there is a slip connection between the members 170 and 171 which allows for inaccuracy of manufacture and for changes in temperature of the machanism, and seals about the opening 174 through which the air to be filtered is passed to the filter member. On either side of each filter member there is positioned a reticulated member shown as a screen 180 which may be formed double with spaces 181 between the two parts, one of these reticulated members being in position adjacent to one face of the adjacent filter element or elements 22. A cleaner pressure pipe 185 is positioned between each filter element and the adjacent screen 180 and has a slot facing the adjacent filter element. Each of these pipes is carried by a central shaft 186 which extends through openings 187 in each of the screens and through the opposite ends of the casing member where it is suitably journaled. Outwardly of one of these it is provided with means by which it may be slowly rotated, such means, as shown, comprising a chain drive 190 which passes about a sprocket wheel 191 secured to the shaft 186 and connected for suitable driving power in a manner similar to the chain drive 92 of Figure 2.

The air to be filtered is introduced into the casing and through its upper openings in the various filter members through a suitable conduit 200 as shown in Figure 25. The dirt removed from the air is taken out through the member 160 and may be discharged from the filter in a manner similar to the discharge shown in Figure 6. The filtered air passes into one end portion of the casing where it may be removed through the end plate 201 as by the use of a suction blower 202 as shown in Figure 22.

It will be apparent that the rectangular casing can be constructed from standard plates and shapes in a cheaper manner than the drum-shaped casing of the previously descriped construction and in many cases is easier to mount and install.

From the foregoing description of an embodiment of this invention it should be evident to those skilled in the art that various changes and modifications may be made therein without departing from its spirit or scope.

I claim:

1. A filter comprising two co-axially spaced annular sheet material filter elements, means engaging and supporting the inner and outer margins of each of said elements, a foraminous support at one side of said elements, a rotary hollow shaft arranged concentric with said filter elements, a blow pipe positioned between said support and said filter elements and having a slot therethrough facing said elements, releasable securing means to releasably secure one end of said pipe to said shaft by operation on the other end of said pipe so that said pipe can receive air under pressure through said hollow shaft, means for directing air to be filtered against the opposite side of said elements from said support, the filtered air passing through said element and support, means for collecting solids filtered out from said air by said element, means for introducing air under pressure to the hollow of said shaft to pass out through said slot, and means for rotating said shaft.

2. A filter member comprising a pair of spaced inner and outer concentric rings, a pair of spaced annular sheet material filter elements having their outer margins overlying the edges of said outer rings and their inner margins overlying the edges of said inner rings, and means for holding the margins of said elements beyond said edges overlying adjacent faces of said rings.

3. A filter member comprising a pair of concentric rings, a pair of sheet material filter elements having their margins overlying the edges of said rings, means for holding the margins of said elements beyond said edges overlying adjacent faces of said rings, a casing enclosing and supporting said member with the axes of said rings substantially horizontal, the outer of said concentric rings having a slot therethrough in its upper portion to receive air to be filtered, and a slot through its lower portion for the discharge of solids filtered from said air, said casing having slots therethrough mating the slots in said ring, and means for sealing the margins of said slots together.

4. A filter member comprising a pair of concentric rings, a pair of sheet material filter elements having their margins overlying the edges of said outer rings and their inner margins overlying the edges of said inner rings, means for holding the margins of said elements beyond said edges overlying adjacent faces of said rings, a casing enclosing and supporting said member with the axes of said rings substantially horizontal, the outer of said concentric rings having a slot therethrough in its upper portion to receive air to be filtered, and a slot through its lower portion for the discharge of solids filtered from said air, said casing having slots therethrough mating the slots in said ring, means for sealing the margins of said slots together comprising gaskets about said slots carried by one of said parts, and marginal flanges carried by the other part pressing into said gaskets.

5. A filter member comprising a pair of concentric rings, a pair of sheet material filter elements having their margins overlying the edges of said rings, and means for holding the margins of said elements beyond said edges overlying adjacent faces of said rings, the outer of said rings having openings between said filter elements for the entrance of air to be filtered and for the discharge of solid material therefrom.

6. A filter member comprising a pair of spaced concentric rings, a pair of sheet material filter elements having their margins overlying the edges of said rings, and means supporting said filter member with the axes of said rings substantially horizontal.

7. A filter member comprising a pair of spaced concentric rings, a pair of sheet material filter elements having their margins overlying the edges of said rings, and means supporting said filter member with the axes of said rings substantially horizontal, said outer ring having an opening therethrough in its upper portion for the entrance of air to be filtered between said elements and an opening therethrough in its lower portion for the discharge of solids.

8. A filter member comprising a pair of concentric rings, a pair of sheet material filter elements having their margins overlying the edges of said rings, and a clamping ring securing each of said margins to said concentric rings, the outer of said concentric rings being slotted between said clamping rings for the passage of air.

9. A filter member comprising a pair of concentric rings, a pair of sheet material filter elements having their margins overlying the edges of said rings, a clamping ring securing each of said margins to said concentric rings, and means supporting said member with the axes of said rings substantially horizontal, the outer of said concentric rings having a slot therethrough in its upper portion to receive air to be filtered and a slot through its lower portion for the discharge of solids filtered from such air.

10. A filter member comprising a pair of concentric rings, a pair of sheet material filter elements having their margins overlying the edges of said rings, a clamping ring securing each of said margins to said concentric rings, casing means supporting said member with the axes of said rings substantially horizontal, the outer of said concentric rings having a slot therethrough in its upper portion to receive air to be filtered and a slot through its lower portion for the discharge of solids filtered from such air, said casing means having a slot mating with the second mentioned ring slot, and means about the margins of said mating slots sealing said supporting means and filter together.

11. A filter member comprising a pair of spaced inner and outer concentric rings, a pair of spaced annular filter elements having inner and outer margins overlying opposite edges of said rings, said margins of the two elements being turned toward each other, and means clamping said turned portions against opposed faces of said rings.

12. A filter member comprising a pair of spaced concentric rings, a pair of annular filter elements having inner and outer margins overlying opposite edges of said rings, said margins of the two elements being turned toward each other, and means clamping said turned portions against opposed faces of said rings, the outer of said rings being reinforced by an annular element engaging its inner face and having an inwardly extending stiffening flange.

13. A filter member comprising a pair of concentric rings, a pair of annular filter elements having inner and outer margins overlying opposite edges of said rings, said margins of the two elements being turned toward each other, means clamping said turned portions against opposed faces of said rings, and a pair of annular elements engaging the inner face of the outer of said rings adjacent to its edges, said annular elements having inwardly extending stiffening flanges.

14. A filter member comprising a pair of concentric ring elements, and an annular filter element having its inner and outer margins secured to said ring elements, the outer of said ring elements being reinforced with a ring of angular cross section engaging its inner face.

15. A filter member comprising a pair of concentric ring elements, an annular filter element having its inner and outer margins secured to said ring elements, the outer margin of said filter element being folded back on itself and secured to form a marginal loop, and a strap threaded through said loop and having its ends secured together, said strap surrounding said outer ring element and holding said margin against the outer face of said outer ring element.

16. A filter member comprising a pair of concentric ring elements, an annular filter element having its inner and outer margins secured to said ring elements, the outer margin of said filter element being folded back on itself and secured to form a marginal loop, a strap threaded through said loop and having its ends secured together, said strap surrounding said outer ring element and holding said margin against the outer face of said outer ring element, an angle member having an outwardly extending flange overlapped by said filter element margin, a casing support for said filter member having an opening therethrough, said outer ring member having a mating opening, flanges at the ends of said mating opening, a gasket surrounding said support opening, said angle presenting with said flanges a continuous edge engaging said gasket, and means for holding said filter member to said casing support.

17. In combination with a sheet material filtering member provided with an opening, a polygonal hollow shaft extending through the opening provided in said filter element, said shaft having an internally threaded hole through one face thereof, a pipe having an externally threaded end for threaded engagement in said hole, and a lock nut threaded on said pipe engaged with the outer face of said shaft when said pipe is in threaded engagement in said hole, said pipe having a slot therethrough longitudinally thereof and facing said filter element.

18. In combination with a sheet material filtering member provided with an opening, a polygonal hollow shaft extending through the opening provided in said filter element, said shaft having an internally threaded hole through one face thereof, a pipe having an externally threaded end for threaded engagement in said hole, and a lock nut threaded on said pipe engaged with the outer face of said shaft when said pipe is in threaded engagement in said hole, said pipe having a slot therethrough longitudinally thereof and facing said filter element, and a plug closing the outer end of said pipe and having means for engagement by a tool by which said pipe may be turned about its axis.

19. A filter comprising a sheet material filtering element provided with an opening, a hollow rotary shaft extending through the opening provided in said element, a blow pipe communicating with the hollow of said shaft and having a slot lengthwise thereof facing said element, a hollow block housing said shaft and having a hole leading to the hollow thereof and through which the inner end of said pipe extends, mating faces of said pipe and said shaft being formed to interfit, and means carried by said block and engaging said pipe for forcing said pipe end against the mating portion of said shaft.

20. A filter comprising a sheet material filtering element provided with an opening, a hollow rotary square shaft extending through the opening provided in said element, a blow pipe connected with the hollow of said pipe and having a slot lengthwise thereof facing said element, a block having a rectilinear slot therethrough through which said pipe extends, said shaft having a hole through one of its sides, the margin of said hole and the inner end of said pipe being formed to interfit, and a set screw threaded through said block and adapted to engage said pipe opposite to said hole to force said margin against said pipe end to thereby seal said pipe and shaft together.

21. A filter member comprising a pair of spaced concentric rings, a layer of felt overlying each of opposite edges of said rings and clamped thereto under tightly stretched condition, the outer of said rings having openings therethrough for the entrance of air to be filtered and for the removal of solids filtered therefrom.

References Cited in the file of this patent

UNITED STATES PATENTS

| | | |
|---|---|---|
| 618,439 | Schaffer | Jan. 31, 1899 |
| 1,847,233 | Bilde | Mar. 1, 1932 |
| 2,062,834 | Schwartz | Dec. 1, 1936 |
| 2,534,171 | Kirby | Dec. 12, 1950 |
| 2,559,428 | Hersey | July 3, 1951 |

FOREIGN PATENTS

| | | |
|---|---|---|
| 353,837 | Great Britain | Jan. 21, 1930 |